United States Patent
Mario

(10) Patent No.: US 11,634,344 B2
(45) Date of Patent: Apr. 25, 2023

(54) APPARATUS AND METHOD FOR TREATING SUBSTANCES USING ASYMMETRIC-VECTOR ELECTRICAL FIELDS

(71) Applicant: Go Green Global Technologies Corp, Brookfield, CT (US)

(72) Inventor: Pandolfo Salvatore Mario, Viterbo (IT)

(73) Assignee: GO GREEN GLOBAL TECHNOLOGIES CORP, Brookfield, CT (US)

( * ) Notice: Subject to any disclaimer, the term of this patent is extended or adjusted under 35 U.S.C. 154(b) by 41 days.

(21) Appl. No.: 17/472,060

(22) Filed: Sep. 10, 2021

(65) Prior Publication Data
US 2023/0079596 A1 Mar. 16, 2023

(51) Int. Cl.
*C02F 1/48* (2006.01)
*C10G 32/02* (2006.01)

(52) U.S. Cl.
CPC .............. *C02F 1/48* (2013.01); *C10G 32/02* (2013.01); *C02F 2201/483* (2013.01); *C02F 2303/04* (2013.01)

(58) Field of Classification Search
CPC .......................... C10G 32/02; C02F 2201/483
See application file for complete search history.

(56) References Cited

U.S. PATENT DOCUMENTS

| | | | | |
|---|---|---|---|---|
| 6,506,299 B1* | 1/2003 | Pandolfo | ................ | C02F 1/485 422/186.01 |
| 8,480,890 B2* | 7/2013 | Holland | ................ | C02F 1/484 210/243 |
| 2009/0236294 A1* | 9/2009 | Wittmer | ................ | H03K 17/79 210/695 |
| 2013/0146464 A1* | 6/2013 | Shiga | .................... | C02F 1/487 204/557 |

* cited by examiner

*Primary Examiner* — Brian W Cohen
(74) *Attorney, Agent, or Firm* — Chamberlain, Hrdlicka, White, Williams & Aughtry

(57) ABSTRACT

A fluid-treatment apparatus has a coil structure, a first circuit formed by a rectifier diode and a capacitor in parallel connection, a second circuit formed by a first coil wound on a first section of the coil structure and a second coil wound on a second section of the coil structure, and a third circuit formed by a third coil wound on the second coil and a fourth coil wound on a third section of the coil structure. The first and second coils have a first winding direction, and the third and fourth coils have a second winding direction opposite to the first winding direction. The first and second coils are a first alternate-current (AC) input terminal and the anode of the rectifier diode. The third and fourth coils are connected to a second alternate-current (AC) input terminal and the cathode of the rectifier diode.

18 Claims, 3 Drawing Sheets

APPARATUS AND METHOD FOR TREATING SUBSTANCES USING ASYMMETRIC-VECTOR ELECTRICAL FIELDS

FIELD OF THE DISCLOSURE

The present disclosure relates generally to apparatus and method for the treatment of liquid or gaseous substances, and in particular to apparatus and method using harmonics amplifier for the generation of asymmetric-vector electrical fields for the treatment of liquid or gaseous substances.

BACKGROUND

Treatment of water, especially treatment of water for human consumption, has many complicated challenges as the goal is both to comply with sanitary regulations and to maintain the working order of the water treatment and distribution devices by protecting them from the accumulation of calcium carbonate (for example, limestone).

Conventionally, ion-exchange water softeners may be used to decrease or prevent the formation of limestone deposits inside pipes and devices in which the water (especially, hard water) flows. However, such as system requires continuous and consistent maintenance.

In treatment of water for human consumption, especially the water distributed through centralized aqueducts to houses and buildings, chlorine is usually added to the water for preventing the growth of bacteria that may otherwise occur due to the mild temperatures favoring bacteria proliferation and the stagnation due to the intermittent flow. However, chlorine has an unpleasant taste and smell and is potentially harmful.

In treatment of water for industrial use and in the sanitation of sewage in purifiers, different chemicals compounds are usually used in considerable amounts, which may have potential risks to the environment and the aquifers.

Thus, there have been numerous efforts to stop the massive use of these chemicals to control their risks to the environment. For example, the European Community has created laws to reduce by 50% the use of chlorine in the water for human consumption due to its pathological effects established by the WHO.

Therefore, there is a desire for a novel environmental-friendly water-treatment apparatus for treating water with impurities.

In energy industries, the conventional methods to produce commonly used fuels derived from petroleum depend on huge refineries which use high temperatures, high pressures, and the heavy use of catalysts to transform crude oil into a variety of products that can be used in internal combustion engines, external combustion engines, and other industrial applications. Because of the refinement costs, the fuels derived from crude oil following the conventional procedures are introduced to the market even though they are not completely cracked: the number of carbon atoms present in the fuel components, even though allowing for a decent combustion, may cause the formation of a significant amounts of polluting residues which need to be treated by a number of different devices downstream of the combustion process in order to reduce their emission in the atmosphere.

Diesel fuel, which is one of the products derived from crude oil, is widely used for transportation and/or heating. However, diesel fuel often contains paraffin wax and sulphur, which, after combustion, are released into the atmosphere as a considerable amount of particulates (such as PM2.5 and PM10), thereby causing serious harm to the environment and to people's health.

Therefore, there is a desire for a novel apparatus for treating fuels to protect and preserve the environment.

SUMMARY

According to one aspect of this disclosure, there is provided an apparatus for treating a fluid. The apparatus comprises: a coil structure having a central bore for passing the fluid therethrough; a first circuit comprising a rectifier diode and a capacitor in parallel connection; a second circuit comprising a first coil wound on a first section of the coil structure and a second coil wound on a second section of the coil structure; and a third circuit comprising a third coil wound on the second coil and a fourth coil wound on a third section of the coil structure; the first coil and the second coil are wound in a first winding direction; the third coil and the fourth coil are wound in a second winding direction opposite to the first winding direction; a starting point of the first coil is connected to an ending point of the second coil and connected to a first alternate-current (AC) input terminal; an ending point of the first coil is connected to a starting point of the second coil and connected to an anode of the rectifier diode; a starting point of the third coil is connected to an ending point of the fourth coil and connected to a second alternate-current (AC) input terminal; and an ending point of the third coil is connected to a starting point of the fourth coil and connected to a cathode of the rectifier diode.

In some embodiments, the coil structure is a tube or conduit, in which the fluid (such as liquid or gas) to be treated flows.

In some embodiments, the tube or conduit is made of a non-magnetic material, a diamagnetic material, or a paramagnetic material.

In some embodiments, the coil structure is made of paper such as insulating and fireproof paper (e.g., GRAF paper), fiberglass, or Teflon.

In some embodiments, the coil structure is a bobbin.

In some embodiments, the fluid-treatment apparatus further comprises: a conduit extending through the central bore of the coil structure for passing the fluid therethrough, the tubing comprising an inlet for receiving a source fluid and an outlet for discharging a treated fluid.

In some embodiments, the conduit, in which the fluid (such as liquid or gas) to be treated flows, is made a non-magnetic material, a diamagnetic material, or a paramagnetic material, or Teflon.

In some embodiments, the coil structure, that as configured and assembled, is a counter-flow multi-vibrator, with the flows amplifying harmonics during their relaxation times, with such harmonics generated by the half-wave rectification of sine-waves between 50 hertz (Hz) and 12 kilohertz (KHz). The coil structure is configured to be powered by AC power source with a voltage from 120 volts (V) to 400 V and a frequency of 50 Hz, 60 Hz, or 120 Hz.

In some embodiments, the fluid-treatment apparatus further comprises: a resonating line extending into the central bore of the coil structure for emerging in the fluid and for resonating to electrical vectors generated by the first, second, and third circuits.

In some embodiments, the resonating line is a steel rod.

In some embodiments, the resonating line is connected to a pair of electrical terminals for connecting to a second AC power source.

In some embodiments, the fluid-treatment apparatus further comprises: a transformer for providing the second AC power source.

In some embodiments, the second AC power source is a 50 Hz to 60 Hz, 4.5 V to 12 V AC power source.

In some embodiments, the fluid-treatment apparatus further comprises: a fourth circuit for indicating working of the treatment apparatus.

In some embodiments, the fourth circuit comprises a fifth coil inductively coupled to the fourth coil and a light-emitting component.

In some embodiments, the light-emitting component is a light-emitting diode (LED).

In some embodiments, the fourth circuit is wound on the fourth coil.

DETAILED DESCRIPTION

Embodiments disclosed herein related to treatment apparatuses for treating fluid with impurities and/or for treating hydrocarbon fuel in an environment-friendly manner, thereby making possible the real, instant, and substantial reduction of the polluting compounds derived from the combustion of hydrocarbons, and providing efficient water treatment without the use of chemicals.

The treatment apparatus disclosed herein uses a pair of inductive circuits to generate electric vectors to affect the substance of matter in liquid or gaseous phase thereby changing its state of aggregation and equilibrium, based on the natural factors of electric kind and the same phenomena that make particles aggregate, by their peculiar ability to respond to the frequencies of aggregation to compose matter.

Figure 1:
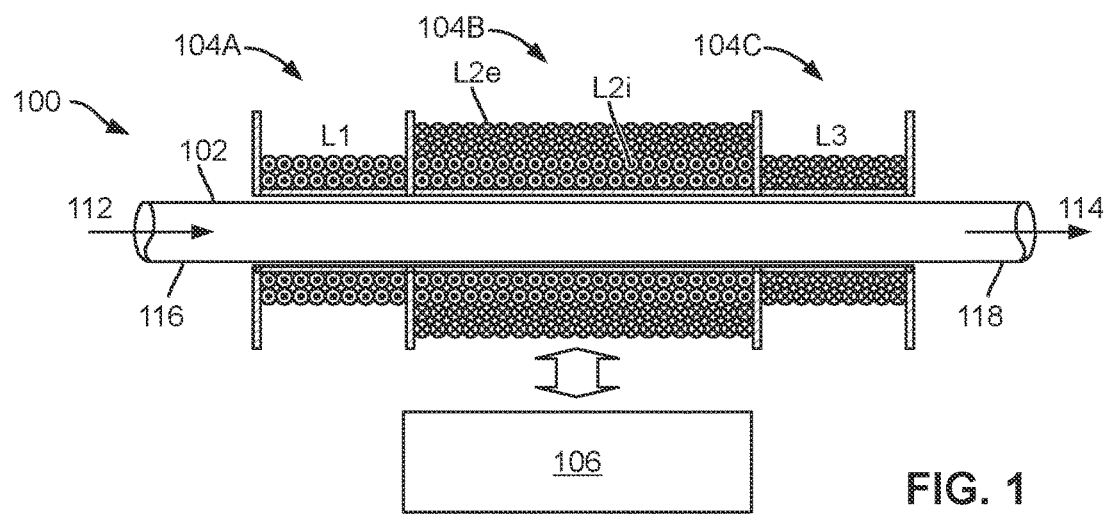
FIG. 1 is a schematic cross-sectional view of a treatment apparatus, according to some embodiments of this disclosure.

Turning now to FIG. 1, a treatment apparatus according to some embodiments of this disclosure is shown and is generally identified using reference numeral 100. The treatment apparatus 100 comprises a conduit 102 concentrically received in a central bore of a coil structure 104, and a treatment circuitry 106 having a plurality of coils L1, L2$i$, L2$e$, and L3 wound on the coil structure 104. In operation, the conduit 102 receives a source fluid 112 to be treated from an inlet 116 thereof and passes the source fluid 112 therethrough. The treatment circuitry 106 uses the coils L1, L2$i$, L2$e$, and L3 to apply an electromagnetic field to the source fluid 112 passing through the conduit 102 for treating the source fluid 112. After treatment, the treated fluid flow is discharged from the outlet 118 of the conduit 102. Herein the source fluid 112 may be in liquid or gas form and may contain aggregate of impurities in solid, liquid, and/or gas form such as water with aggregate of impurities, waste water, sewage, and/or the like. The source fluid 112 may also be hydrocarbon, vegetable oils, or mineral oils for use as fuel.

The conduit 102 may be made of a non-magnetic material, a diamagnetic material, or a paramagnetic material, such as stainless steel, copper, fiberglass, and/or the like with suitable thickness (described in more detail below) to sustain the operating pressure.

Figure 2A:
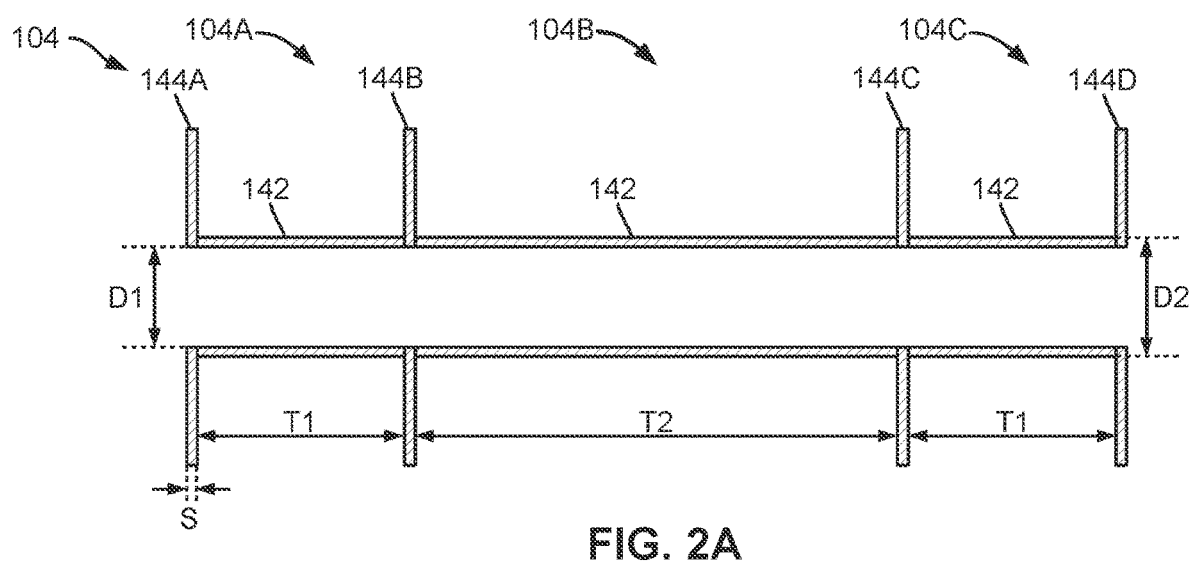
FIG. 2A is a schematic cross-sectional view of a coil structure of the treatment apparatus shown in FIG. 1.
Figure 2B:
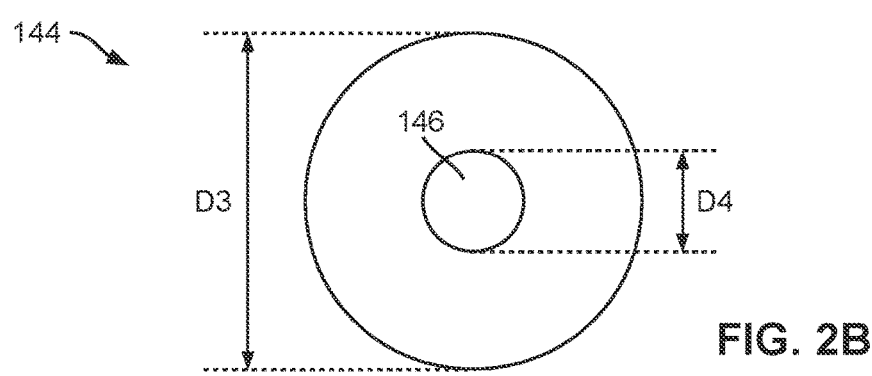
FIG. 2B is a schematic side view of the coil structure shown in FIG. 2A.

Similarly, the coil structure 104 in these embodiments is in the form of a bobbin made of non-magnetic material, a diamagnetic material, or a paramagnetic material such as paper (for example, GRAF paper which is an insulating and fireproof material), paperboard, fiberglass, and/or the like with suitable thickness (described in more detail below) to sustain the operating pressure. As shown in FIGS. 2A and 2B, the coil structure 104 comprises a scaffold 142 in the form of a cylindrical tube and four flanges 144A to 144D coupled to the scaffold 142 and partitioning it to three coil sections 104A to 104C. In some embodiments, the two end sections 104A and 104C have a same length T1 and the middle coil section 104B has a length T2 greater than the length T1.

In some embodiments, the length T1 of each of the two end sections 104A and 104C is about 36 millimeters (mm), and the length T2 of the middle section 104B is 68 mm. The internal and external diameters D1 and D2 of the scaffold 142 are 18 mm and 20 mm, respectively. The thickness S of each of the flanges 104 is 2 mm, the diameter D3 of each of the flanges 104 is 42 mm, and the diameter D4 of the hole 146 of each of the flanges 104 is 20 mm.

In some other embodiments, the length T1 of each of the two end sections 104A and 104C is about 36 millimeters (mm), and the length T2 of the middle section 104B is about 72 mm. The internal and external diameters D1 and D2 of the scaffold 142 are about 22 mm and about 24 mm, respectively. The thickness S of each of the flanges 104 is about 2 mm, the diameter D3 of each of the flanges 104 is about 42 mm, and the diameter D4 of the hole 146 of each of the flanges 104 is about 24 mm.

In some yet other embodiments, the length T1 of each of the two end sections 104A and 104C is about 48 millimeters (mm), and the length T2 of the middle section 104B is about 98 mm. The internal and external diameters D1 and D2 of the scaffold 142 are about 28 mm and about 30 mm, respectively. The thickness S of each of the flanges 104 is about 2 mm, the diameter D3 of each of the flanges 104 is about 55 mm, and the diameter D4 of the hole 146 of each of the flanges 104 is about 30 mm.

In some still other embodiments, the length T1 of each of the two end sections 104A and 104C is about 58 millimeters (mm), and the length T2 of the middle section 104B is about 116 mm. The internal and external diameters D1 and D2 of the scaffold 142 are about 34 mm and about 36 mm, respectively. The thickness S of each of the flanges 104 is about 2 mm, the diameter D3 of each of the flanges 104 is about 60 mm, and the diameter D4 of the hole 146 of each of the flanges 104 is about 36 mm.

In some embodiments, the conduit 102 has an external diameter equal to or slightly smaller than the internal diameter D1 of the bobbin 104 for receiving therein. In some other embodiments, the scaffold 142 of the bobbin 104 forms the conduit 102 which may be coupled to an inlet 116 and an outlet 118 on the opposite ends thereof, respectively, for receiving the source fluid and discharging the treated fluid.

Referring again to FIG. 1, four coils L1, L2e, L2i, and L3 are wound on the three coil sections 104A to 104C. In particular, the first end coil L1 is wound on a first end section 104A adjacent the inlet 116 and the second end coil L3 is wound on the second end section 104C adjacent the outlet 118. The middle coils L2e and L2i are wound on the middle section 104B with the coil L2i being the internal middle coil wound on the scaffold 142 of the middle section 104B and the coil L2e being the external middle coil wound on the internal coil L2i.

Each of the coils L1, L2i, L2e, and L3 starts its winding at a respective starting point and ends at a respective ending point. The winding direction of the external middle coil L2e is opposite to that of the internal middle coil L2i (in other words, L2e and L2i have a reverse flow arrangement in order to obtain asymmetrical vectors with respect to the electrical current directions thereof), the winding direction of the first end coil L1 is the same as that of the internal middle coil L2i (in other words, L1 and L2i have a same voltage phase arrangement, or the voltage phase shift between L1 and L2i is 0°), and the winding direction of the second end coil L3 is the same as that of the external middle coil L2e (in other words, L3 and L2e have a same voltage phase arrangement, or the voltage phase shift between L3 and L2e is 0°).

For example, in the example shown in FIG. 1, the winding direction of coils L1 and L2i (indicated by a dot) is a direction going out of the paper (or, for example, clockwise), and the winding direction of coils L2e and L3 (indicated by a cross) is a direction going into the paper (or, for example, counterclockwise).

Figure 3:
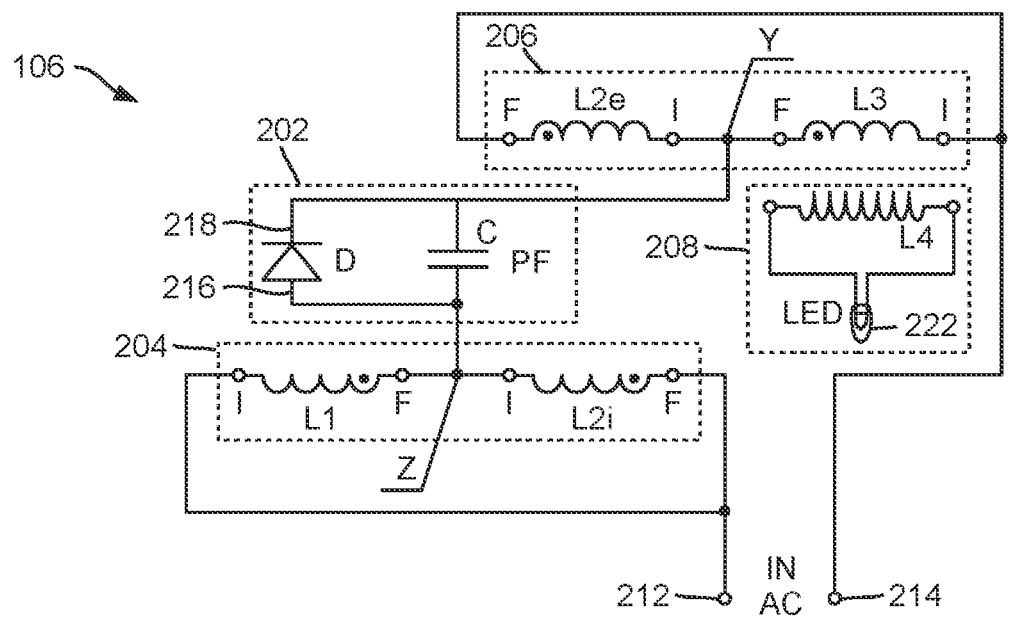
FIG. 3 is a circuit diagram of the treatment apparatus shown in FIG. 1.

FIG. 3 shows the circuitry 106 of the treatment apparatus 100. As shown, the circuitry 106 comprises a first circuit 202, a second circuit 204, a third circuit 206, and an alternate-current (AC) input IN for connecting to a AC power source with a voltage from 120 to 400 volts (V) and a frequency of 50 hertz (Hz), 60 Hz, or 120 Hz (for example, a 120 V, 60 hertz (Hz) AC power source or a 220 V, 50 Hz AC power source). Thus, the treatment apparatus 100 may be powered directly by the standard power grid without using any transformer.

The first circuit 202 comprises a rectifier diode D and a capacitor C in parallel connection. The rectifier diode D is a diode suitable for the use with currents of milliampere (mA) or ampere; for example, in some embodiments, the rectifier diode D may be a power diode with a heavily doped P+ layer and a lightly doped N− layer growing on a heavily doped N+ layer, suitable for operating under large current. For example, in some embodiments, the rectifier diode D is a SEMIKRON SKN 26/16 power rectifier diode offered by SEMIKRON of Nuremberg, Germany.

The capacitance of the capacitor C is determined by the thickness of the wire of the coils L1, L2i, L2e, and L3, is also dependent upon the size of the coils L1, L2i, L2e, and L3 wound on the coil structure 104. For example, in some embodiments, the capacitor C is a 110,000 picofarads (pf) capacitor.

The second circuit 204 comprises the first end coil L1 and the internal middle coil L2i (which are of the same winding direction) for detecting the noise signal derived from the levelling of the sine waves of an AC power source (coupled to the AC input IN) caused by the operation of the rectifier diode D. The starting point (I) of the first end coil L1 is connected to the ending point (F) of the internal middle coil L2i which are connected to a first terminal 212 of the AC input IN. The ending point (F) of the first end coil L1 is connected to the starting point (I) of the internal middle coil L2i which are connected to the anode 216 of the rectifier diode D (and thus also connected to a first end of the capacitor C that is connected to the anode 216 of the rectifier diode D).

The third circuit 206 comprises the external middle coil L2e and the second end coil L3 (which are of the same winding direction) for amplify the signal of the beat frequencies (which are generated the sum and the difference of adjacent frequencies) of the second circuit 204 of coils L1 and L2i. The starting point (I) of the second end coil L3 is connected to the ending point (F) of the external middle coil L2e which are connected to a second terminal 214 of the AC input IN. The ending point (F) of the second end coil L3 is connected to the starting point (I) of the external middle coil L23 which are connected to the cathode 218 of the rectifier diode D (and thus also connected to a second end of the capacitor C that is connected to the cathode 218 of the rectifier diode D).

The fourth circuit 208 comprises a high-luminosity indicator light-emitting component 222 such as a light-emitting diode (LED) connected to an indicator coil L4 inductively engaging the second end coil L3 for revealing the resonance frequencies and powering the indicator LED 222 for indicating the proper working of the treatment apparatus 100.

Figure 4:
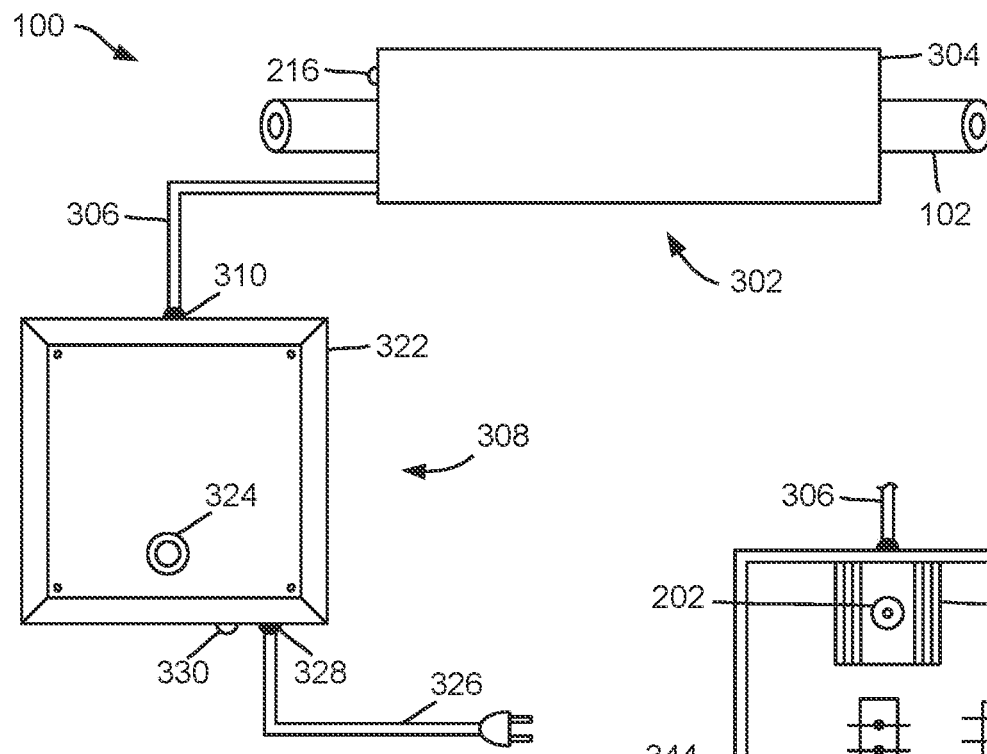
FIG. 4 is a schematic plan view of the assembled treatment apparatus shown in FIG. 1.

FIG. 4 is a schematic plan view of the assembled treatment apparatus 100. As shown, the assembled treatment apparatus 100 comprises coil tube 302 about the conduit 102. The coil tube 302 comprises the bobbin 104, the coils L1, L2i, L2e, and L3 wound thereon as shown in FIG. 1, and the indicator coil L4, all received in an enclosure 304 made of an insulating and fireproof material. The indicator LED 222 extends out of the enclosure 304.

A cable 306 extends from the coil tube 302 to a power box 308 via a cable clamp 310 for connecting the coils L1, L2i, L2e, and L3 in the coil tube 302 to the circuits in the power box 308. In some embodiments, the cable 306 has a length of two meters (m) and comprises four wires (for example, WHITE, BLACK, YELLOW, and GREEN), with each wire of 0.5 mm thickness. Two of the four wires, for example, WHITE and BLACK, are used for connecting the coils L1, L2i, L2e, and L3 in the coil tube 302 to the power source, and the other two wires, for example, YELLOW and GREEN, are used for connecting the first circuit 202 in the power box 308 (described later), with the YELLOW wire connecting to the cathode 218 of the rectifier diode D of the first circuit 202 and the GREEN wire connecting to the anode 216 of the rectifier diode D of the first circuit 202.

The power box 308 comprises a case 322 (for example, made of self-extinguishing neoprene) with an indicator light 324 connecting to the circuits therein and extending from a front side thereof. A power cable 326 (for example, a 1.5 m long, three wire cable with each wire of 1.5 mm thickness) extends into the power box 308 via a cable clamp 328 for connecting to the power source. The power box 308 also comprises a fuse holder 330 on the case 322 receiving therein a fuse connected to the circuits in the power box 308.

Figure 5:
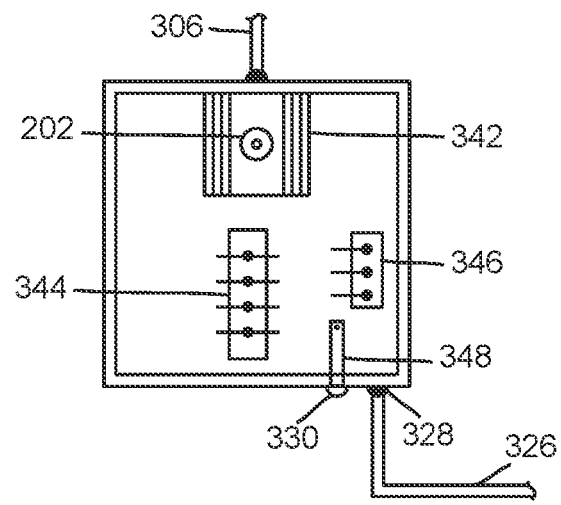
FIG. 5 is a schematic plan view of a power box of the assembled treatment apparatus shown in FIG. 4, showing the components received therein.

FIG. 5 shows the circuits in the power box 308. As shown, the power box 308 receives therein the first circuit 202 (including the rectifier diode D and capacitor C in parallel connection) with the rectifier diode D thereof mounted on one or more cooling plates 342 (for example, one or more aluminum cooling plates) for heat management. As described above, the first circuit 202 is connected to the YELLOW and GREEN wires of the cable 306 with the YELLOW wire connecting to the cathode 218 of the rectifier diode D of the first circuit 202 and the GREEN wire connecting to the anode 216 of the rectifier diode D of the first circuit 202.

The power box 308 also receives therein a plurality of terminal blocks 244 and 346 for wiring, and a fuse 348 (for example, a 0.5 amps (A) quick fuse) received in the fuse holder 330.

The treatment apparatus 100 described above may be used to treat source fluid 112 passing through the conduit 102 based on many chemists' discoveries.

Since 1907, the chemists O. WIDMAN and KNUT ANGSTROM at Uppsala University, Sweden, with their studies on colloidal electric synthesis, had discovered that, if an electric discharge is generated between two pieces of any material immersed in a liquid, the two pieces are pulverized, atomized, more or less energetically, in a way directly related to the amplitude and frequency of the electric discharge.

Following on these observations, the chemist Jim M. BREIDING made an important discovery that, using a liquid of sufficient purity (such as water), the products of the pulverization of particular metals can be permanently suspended in the liquid, that is, they can be maintained in colloidal solution.

However, the focus of these studies was to observe the colloids generated by the electric discharge, and they overlooked what was happening to the liquid used.

In the treatment apparatus 100 disclosed herein, the electric discharges are replaced by electric vectors. Herein, the electrical vectors are electrical fields with tuned amplitude and frequencies. One may consider an electrical field as an electrical vector represented by field lines, wherein a positive electric charge generates the radial field lines directed away from it, and it is defined as the source of the force lines, while for a negative point-like charge the radial field lines are defined as being directed towards it, which is therefore defined as the well of the force lines.

The treatment apparatus 100 (and more specifically the system of coils L1, L2i, L2e, and L3 coaxially coiled on the conduit 102) uses electrical vectors to treat the source fluid 112 passing through the conduit 102 by modifying or disturbing the unwanted molecular elements of aggregates of impurities in the source fluid 112.

As those skilled in the art will appreciate, liquids (such as water) with dissolved mineral salts are usually electrically conductive. Therefore, when the coils L1, L2i, L2e, and L3 of the treatment apparatus 100 emit electric vectors to the source fluid 112, the polarizing effect of electric vectors of varying amplitude and frequency may cause changes in the aggregates of impurities in the liquids and affect the state of equilibrium thereof. More specifically, the electrical vectors may interfere at the molecular level with the liquid being treated, generating polarized aggregates and a new, stable status of higher energy for the liquid with a higher level of fragmentation of the aggregates.

The treatment apparatus 100 acts as a counter-flow multivibrator for emitting polarized and oscillating electrical vectors with tuned amplitude and frequencies. Such a multivibrator is formed by the pair of inductive circuits 204 and 206 (that is, the coil groups L1/L2i and L2e/L3) coaxially wound on the conduit 102, which operate in "phase/antiphase" and generate the electrical vectors from the harmonics (for example, between 50 Hz and 12 kilohertz (KHz)) originated by the half-wave rectification of sine-waves (by the first circuit 202 of the rectifier diode D and capacitor C).

The pair of inductive circuits 204 and 206, whose connection is unbalanced by phase displacement, enable the treatment apparatus 100 to generate the polarized electrical vectors to hold the aggregates for a defined time (wherein the aggregates are held by the opening of the diode so that the coils are in phase for some microseconds) and allow the electrical vectors with polarizing variation in amplitude and frequency to modify the molecular elements of aggregates of impurities in the source fluid 112.

Moreover, one of the advantages is the processing of the "ripple" which is the noise signal derived from the beats of adjacent frequencies generated by the coils L1, L2e, L2i, and L3 (which are useful when they resonate positively). The ripple is resulted from the half-wave rectification (by the rectifier diode D) of alternated sine currents or any wave with inverted crests and with variable amplitude and frequency, which determines the amplitude of crest-to-crest voltage and the base frequency as a result of the half-wave rectification. The capacitor acts as a damper for the crests/peaks for the temporary interruption caused by the diode D and prevents the formation of harmful noise signal.

In some embodiments, the treatment apparatus 100 may be used for treating other types of liquids such as hydrocarbons, vegetable oils or mineral oils used as fuel, and/or the like, wherein the electrical vectors generated by the coils L1, L2e, L2i, and L3 interfere with the liquid to generate a substantial fragmentation of molecular aggregates, thereby causing a considerable refining of treated hydrocarbons or causing transesterification in the treated vegetable oils, and thus making them suitable to be use as excellent low-polluting fuels for diesel engines.

Figure 6A:
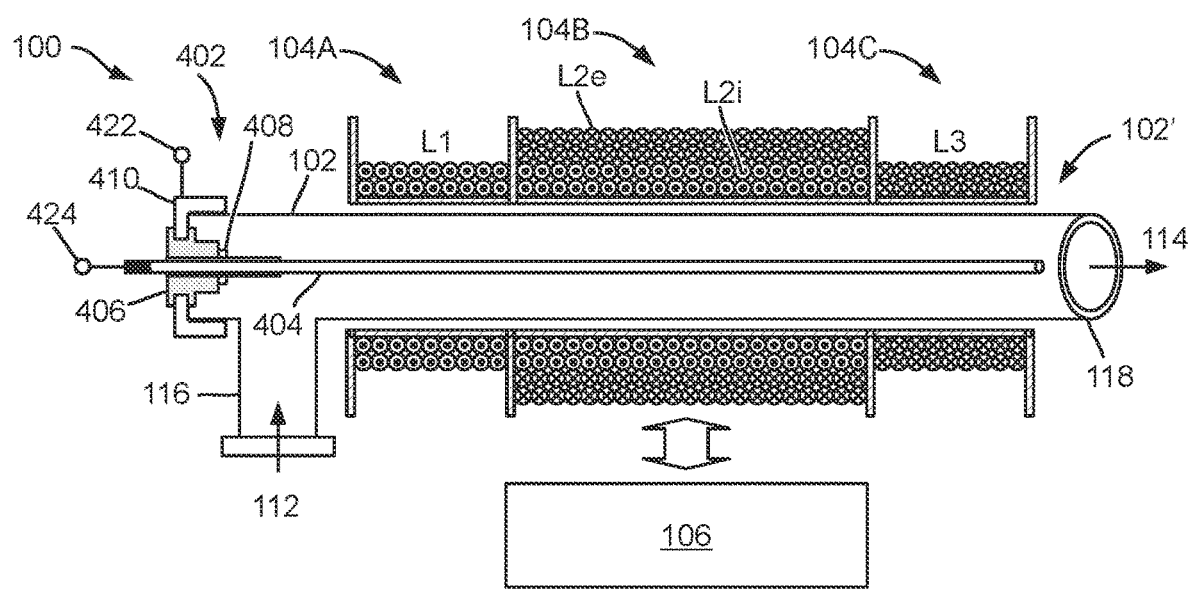
FIG. 6A is a schematic cross-sectional view of a treatment apparatus, according to some embodiments of this disclosure.
Figure 6B:
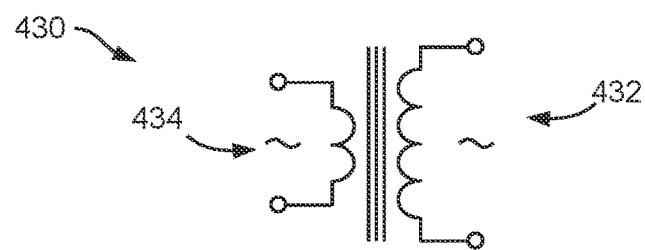
FIG. 6B is a schematic diagram of a transformer connected to a resonating line of the treatment apparatus shown in FIG. 6A.

FIGS. 6A and 6B show a treatment apparatus 100 in some embodiments. Compared to the treatment apparatus shown in FIG. 1, the treatment apparatus 100 in these embodiments comprises a resonating line inside the conduit 102 for emerging in the source fluid and is suitable for treatment of highly polluted liquid.

As shown in FIG. 6A, the conduit 102 in these embodiments is a L-shape tube, for example, a L-shape fiberglass tube having a the main portion 102' (from the elbow 402 to the outlet 118) of a thickness of 3 mm, a length of 30 centimeters (cm), and a ¾ inch (that is, 19 mm) diameter central bore. The main portion 102' of the conduit 102 is received in the coil structure 104. Coils L1, L2i, L2e, and L3 are wound on the coil structure 104 in a same manner as in FIG. 1. Coils L1 and L3 are made of 3200 windings of H200, 0.28 mm thick copper wire, and coils L2i and L2e are made of 2300 windings of H200, 0.28 mm thick copper wire. L4 is made of 400 windings of H200, 0.28 mm thick copper wire wound on coil L3.

A resonant line 404 in the form of a steel rod (such as a rod made of AISI 416 stainless steel with a diameter of 2 mm and a length of 87 mm) extends from the elbow of the conduit 102 towards the outlet 118 thereof. The elbow 402 is then sealed using watertight seals 406 and 408 made of a suitable material such as Teflon. A bronze lid 410 then closes the elbow 402 and supports the resonant line 404 inside the conduit 102.

The two ends of the resonant line 404 are electrically connected to the terminal 422 and 424 which are in turn connect to a low-voltage sine-wave AC power source such as a 50 Hz to 60 Hz, 4.5 V to 12 V AC power source adaptable depending on the size of the apparatus 100.

As shown in FIG. 6B, the low-voltage sine-wave AC power source may be provided using a transformer 430 (such as a 30 VA transformer with an internal core of paper) with the primary side 432 coupled to the AC power grid (such as the standard 110V, 60 Hz power grid or the standard 220V, 50 Hz power grid), and the secondary side connected to the resonant line 404 via the terminal 422 and 424 for powering the resonant line 404 and decoupling the resonant line 404 from the AC power grid.

In operation, the resonating line 404 inside the conduit 102 enhances the polarized and oscillating electrical vectors generated by the coils L1, L2*i*, L2*e*, and L3, for interfering with the flowing liquid, inducing molecular fragmentation, and providing a more effective bacterial abatement. The resonating line 404 may also prevent the transformation of solutes into aggregates that are unresponsive to the electrical vectors generated by the coils L1, L2*i*, L2*e*, and L3 (for example, preventing the transformation of bicarbonate in solution into calcium carbonate in suspension during the treatment of water).

In some embodiments, the resonating line 404 may also be a passive component (that is, not connecting to any power source). In operation, the oscillating electrical vectors generated by the coils L1, L2*i*, L2*e*, and L3 causes the resonating line 404 to oscillate thereby creating other beats, which creates an additional range of frequencies (up to several megahertz (MHz).

The treatment apparatus 100 disclosed herein allows to obtain results relevant for the ecology of the environment, and specifically for using electrical vectors to treat different liquids from the sanitation of sewage to the purification of water for human consumption, thereby allowing the reduction or the complete elimination of the use of chlorine for controlling bacterial contamination to comply with sanitary regulations. The treatment apparatus 100 disclosed herein may also be used for treatment of high-density hydrocarbons for improving their quality and the thermal efficiency as fuel. The treatment apparatus 100 disclosed herein may further be used for treatment of mineral oils, wherein the molecular fragmentation obtained through treatment makes them suitable to be used as fuel with reduced pollution and excellent thermal efficiency. The treatment apparatus 100 disclosed herein may also be used for treatment of vegetable oils, wherein the transesterification caused by the treatment apparatus 100 makes them suitable for the production of energy, in external combustion engines (such as furnaces), or in internal combustion engines (such as diesel engines of any size and type of fuel pumps).

Although embodiments have been described above with reference to the accompanying drawings, those of skill in the art will appreciate that variations and modifications may be made without departing from the scope thereof as defined by the appended claims.

What is claimed is:

1. A apparatus for treating a fluid, the apparatus comprising:
    a coil structure having a central bore for passing the fluid therethrough;
    a first circuit comprising a rectifier diode and a capacitor in parallel connection;
    a second circuit comprising a first coil wound on a first section of the coil structure and a second coil wound on a second section of the coil structure; and
    a third circuit comprising a third coil wound on the second coil and a fourth coil wound on a third section of the coil structure;
    wherein the first coil and the second coil are wound in a first winding direction;
    wherein the third coil and the fourth coil are wound in a second winding direction opposite to the first winding direction;
    wherein a starting point of the first coil is connected to an ending point of the second coil and connected to a first alternate-current (AC) input terminal;
    wherein an ending point of the first coil is connected to a starting point of the second coil and connected to an anode of the rectifier diode;
    wherein a starting point of the third coil is connected to an ending point of the fourth coil and connected to a second alternate-current (AC) input terminal; and
    wherein an ending point of the third coil is connected to a starting point of the fourth coil and connected to a cathode of the rectifier diode.

2. The fluid-treatment apparatus of claim 1, wherein the coil structure is made of a non-magnetic material, a diamagnetic material, or a paramagnetic material.

3. The fluid-treatment apparatus of claim 1, wherein the coil structure is made of paper, paperboard, or fiberglass.

4. The fluid-treatment apparatus of claim 1, wherein the coil structure is a bobbin.

5. The fluid-treatment apparatus of claim 1 further comprising:
    a conduit extending through the central bore of the coil structure for passing the fluid therethrough, the conduit comprising an inlet for receiving a source fluid and an outlet for discharging a treated fluid.

6. The fluid-treatment apparatus of claim 5, wherein the conduit is made a non-magnetic material, a diamagnetic material, or a paramagnetic material.

7. The fluid-treatment apparatus of claim 5, wherein the conduit is made paper, paperboard, or fiberglass.

8. The fluid-treatment apparatus of claim 1, wherein the first, second, and third circuits are configured for generating electrical vectors with harmonics between 50 hertz (Hz) and 12 kilohertz (KHz).

9. The fluid-treatment apparatus of claim 1, wherein the first and second AC input terminals are configured for connecting to a first AC power source with a voltage from 120 to 400 volts (V) and a frequency of 50 Hz, 60 Hz, or 120 Hz.

10. The fluid-treatment apparatus of claim 1 further comprising:
    a resonating line extending into the central bore of the coil structure for emerging in the fluid and for resonating to electrical vectors generated by the first, second, and third circuits.

11. The fluid-treatment apparatus of claim 10, wherein the resonating line is a steel rod.

12. The fluid-treatment apparatus of claim 11, wherein the resonating line is connected to a pair of electrical terminals for connecting to a second AC power source.

13. The fluid-treatment apparatus of claim 12 further comprising:
    a transformer for providing the second AC power source.

14. The fluid-treatment apparatus of claim 12, wherein the second AC power source is a 50 Hz to 60 Hz, 4.5 V to 12 V AC power source.

15. The fluid-treatment apparatus of claim 1 further comprising:
    a fourth circuit for indicating working of the treatment apparatus.

16. The fluid-treatment apparatus of claim 15, wherein the fourth circuit comprises a fifth coil inductively coupled to the fourth coil and a light-emitting component.

17. The fluid-treatment apparatus of claim 16, wherein the light-emitting component is a light-emitting diode (LED).

18. The fluid-treatment apparatus of claim 16, wherein the fourth circuit is wound on the fourth coil.

* * * * *